(12) United States Patent
Majaniemi et al.

(10) Patent No.: US 12,224,564 B2
(45) Date of Patent: Feb. 11, 2025

(54) FEEDTHROUGH ASSEMBLY

(71) Applicant: ABB Schweiz AG, Baden (CH)

(72) Inventors: Hannu Majaniemi, Vaasa (FI); Tomi Rantamarkkula, Vaasa (FI); Eero Tuppi, Vaasa (FI)

(73) Assignee: ABB Schweiz AG, Baden (CH)

( * ) Notice: Subject to any disclaimer, the term of this patent is extended or adjusted under 35 U.S.C. 154(b) by 211 days.

(21) Appl. No.: 17/907,199

(22) PCT Filed: Mar. 23, 2021

(86) PCT No.: PCT/EP2021/057367
§ 371 (c)(1),
(2) Date: Sep. 23, 2022

(87) PCT Pub. No.: WO2021/191181
PCT Pub. Date: Sep. 30, 2021

(65) Prior Publication Data
US 2023/0105419 A1    Apr. 6, 2023

(30) Foreign Application Priority Data
Mar. 24, 2020   (EP) ..................................... 20165111

(51) Int. Cl.
*H02G 3/06*     (2006.01)
*H02G 3/22*     (2006.01)
*H02G 15/013*   (2006.01)

(52) U.S. Cl.
CPC ............ *H02G 3/0658* (2013.01); *H02G 3/22* (2013.01); *H02G 15/013* (2013.01)

(58) Field of Classification Search
CPC .. H02G 3/22; H02G 3/24; H02G 3/28; H02G 3/281; H02G 3/283; H02G 2/386;
(Continued)

(56) References Cited

U.S. PATENT DOCUMENTS 4,549,037 A * 10/1985 Bawa ..................... H02G 3/088
174/667
5,015,804 A * 5/1991 Nattel .................... H02G 3/088
174/77 R
(Continued)

FOREIGN PATENT DOCUMENTS

DE    102010006893 A1   8/2011
DE    102019001136 A1   8/2019
GB       2072792 A     10/1981

OTHER PUBLICATIONS

European Search Report; Application No. EP 20 16 5111; Issued: Jul. 24, 2020; 2 Pages.
(Continued)

*Primary Examiner* — Angel R Estrada
(74) *Attorney, Agent, or Firm* — Whitmyer IP Group LLC

(57) ABSTRACT

A feedthrough assembly including a sealing member including a body part having a sealing member aperture, at least one elongated member extending through the sealing member aperture, and a feedthrough member including a body part having a feedthrough aperture extending through the body part, the feedthrough member being adapted to be attached to a wall having a through hole such that the feedthrough aperture and the through hole together provide a passage through the wall. The feedthrough member is adapted to receive the sealing member in the feedthrough aperture to an operative position in which the feedthrough member is rotatable relative to the sealing member, and a gap between an outer surface of the sealing member and a surface of the feedthrough aperture is less than or equal to 250 micrometres.

14 Claims, 2 Drawing Sheets

(58) Field of Classification Search
CPC ...... H02G 3/0658; H02G 15/013; H02G 3/06;
H02G 3/0616; H01R 13/5205; H01R
13/622; H01R 13/621; F16L 5/06; F16L
5/08; F16L 5/00
USPC ............ 174/151, 152 G, 650, 653, 657, 659,
174/68.1, 68.3, 77 R, 84 R, 85, 93, 667,
174/656, 655, 651, 74 R, 72 A, 652, 135;
439/589, 587, 271, 272, 275, 276, 277;
277/602, 603, 312, 314, 608, 617, 625,
277/628
See application file for complete search history.

(56) References Cited

U.S. PATENT DOCUMENTS

| | | | | |
|---|---|---|---|---|
| 5,399,807 | A | 3/1995 | Yarbrough et al. | |
| 5,621,191 | A * | 4/1997 | Norris | H02G 3/0675 |
| | | | | 174/653 |
| 6,259,029 | B1 * | 7/2001 | Hand | H02G 15/043 |
| | | | | 174/74 A |
| 6,809,263 | B2 * | 10/2004 | Jackson | H02G 3/065 |
| | | | | 174/651 |
| 6,812,406 | B2 * | 11/2004 | Hand | H02G 3/0666 |
| | | | | 174/135 |
| 8,288,667 | B2 * | 10/2012 | Chiou | H02G 3/0658 |
| | | | | 174/655 |
| 8,367,944 | B2 * | 2/2013 | Chiou | H02G 3/0691 |
| | | | | 174/653 |
| 8,581,120 | B2 * | 11/2013 | Winship | H02G 15/013 |
| | | | | 174/650 |
| 9,059,580 | B2 * | 6/2015 | Magno, Jr. | H02G 15/013 |
| 9,352,150 | B2 | 5/2016 | Stevenson et al. | |
| 10,193,321 | B2 * | 1/2019 | Proud | H01B 13/323 |
| 10,594,127 | B2 * | 3/2020 | Portillo Gallego | H02G 15/04 |
| 2011/0259637 | A1 | 10/2011 | Winship | |
| 2016/0186737 | A1 | 6/2016 | Tolbert, Jr. et al. | |

OTHER PUBLICATIONS

International Search Report and Written Opinion of the International Searching Authority; Application No. PCT/EP2021/057367; Completed: Jun. 11, 2021; Mailing Date: Jun. 18, 2021; 10 Pages.
European Office Action; Application No. 20165111.4; Issued: Sep. 5, 2023; 7 Pages.
Indian Office Action and Examination Report; Application No. 202247060456; Mailed: Jan. 20, 2023; 7 Pages.

* cited by examiner

FEEDTHROUGH ASSEMBLY

TECHNICAL FIELD

The present invention relates to a feedthrough assembly.

BACKGROUND

A known flameproof feedthrough assembly comprises electric cables hermetically sealed by resin to a sealing member adapted to be screwed to a wall. The hermetical sealing between the electric cables and the sealing member is adapted to prevent flame transmission from one side of the wall to the other side of the wall.

One of the problems associated with the above feedthrough assembly is that when the sealing member is screwed to the wall or from the wall, the electric cables rotate with the sealing member. In case the wall is an enclosure wall of a motor housing, there might not be enough space inside the motor housing for the electric cables to rotate, wherein installing and replacing the feedthrough assembly is difficult.

SUMMARY

An object of the present invention is to provide a feedthrough assembly so as to solve the above problem. The objects of the invention are achieved by a feedthrough assembly described in the following.

The invention is based on the idea of providing a feedthrough assembly with a sealing member and feedthrough member, wherein at least one elongated member such as an electric cable is immovably sealed to the sealing member, and the feedthrough member is adapted to receive the sealing member such that there is only a small gap between the sealing member and feedthrough member, and the feedthrough member is rotatable relative to the sealing member. The feedthrough member is adapted to be attached to a wall.

An advantage of the feedthrough assembly of the invention is that the feedthrough assembly can be quickly installed to a wall and from the wall without a need to rotate the at least one elongated member relative to the wall.

BRIEF DESCRIPTION OF THE DRAWINGS

In the following the invention will be described in greater detail by means of preferred embodiments with reference to the attached drawings, in which.

DETAILED DESCRIPTION

Figure 1:
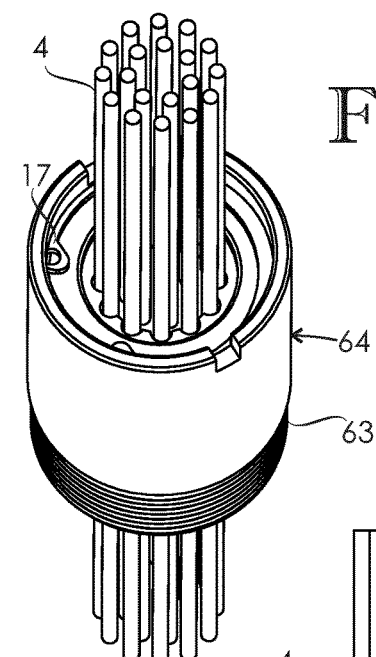
FIG. 1 shows a feedthrough assembly according to an embodiment of the present invention.
Figure 2:
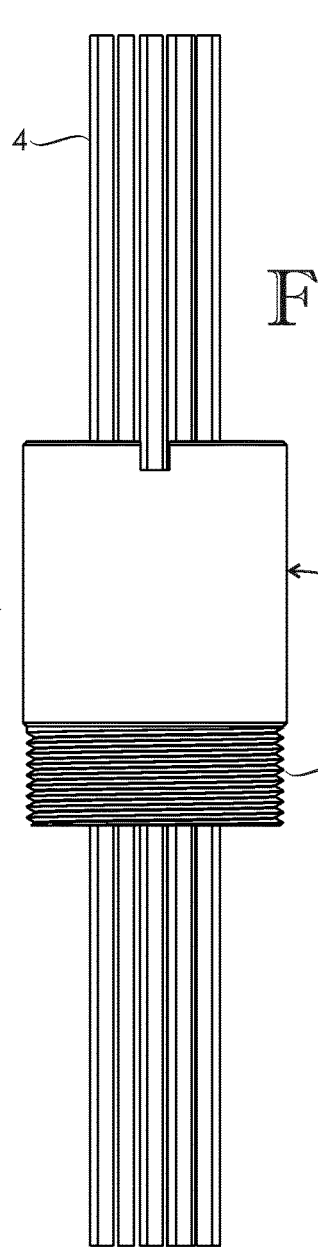
FIG. 2 shows a side view of the feedthrough assembly of FIG. 1.
Figure 3:
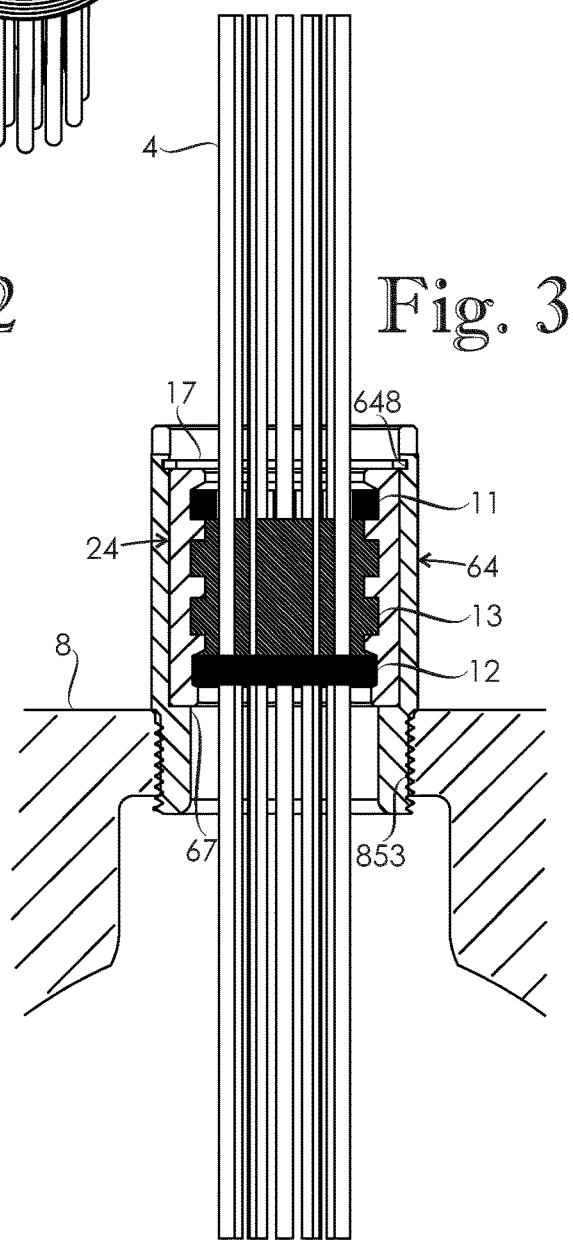
FIG. 3 shows a cross-section of the feedthrough assembly of FIG. 2 attached to a wall.

FIG. 1 is an axonometric projection of a feedthrough assembly comprising a sealing member, a plurality of elongated members 4, a feedthrough member 6 and a retaining system. The feedthrough assembly is a flameproof feedthrough assembly. FIG. 2 shows a side view of the feedthrough assembly of FIG. 1, and FIG. 3 shows a cross-section of the feedthrough assembly of FIG. 2 attached to a wall 8.

Figure 4:
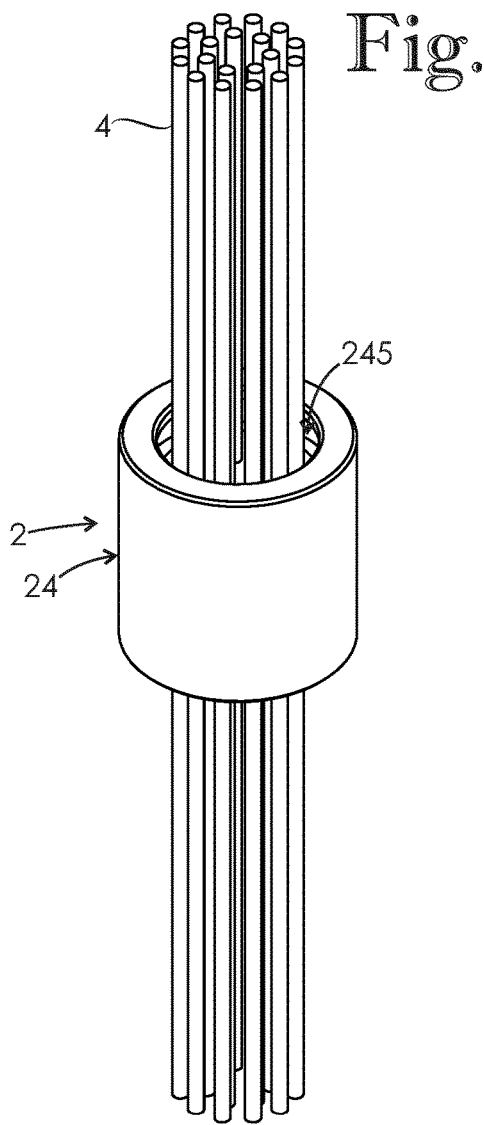
FIG. 4 shows a sealing member and plurality of elongated members of the feedthrough assembly of FIG. 1

FIG. 4 shows the sealing member 2 with the plurality of elongated members 4. The sealing member 2 comprises a body part 24, which has a sealing member aperture 245 extending through the body part 24 in an axial direction of the body part 24, which is a vertical direction in FIG. 3. The sealing member 2 is made of metallic material.

The plurality of elongated members 4 extends through the sealing member aperture 245, and is sealed to a surface of the sealing member aperture 245. The elongated members 4 are electric cables each comprising a conductor surrounded by an insulation. In alternative embodiments, the at least one elongated member comprises a pneumatic hose or some other flexible member.

Figure 5:
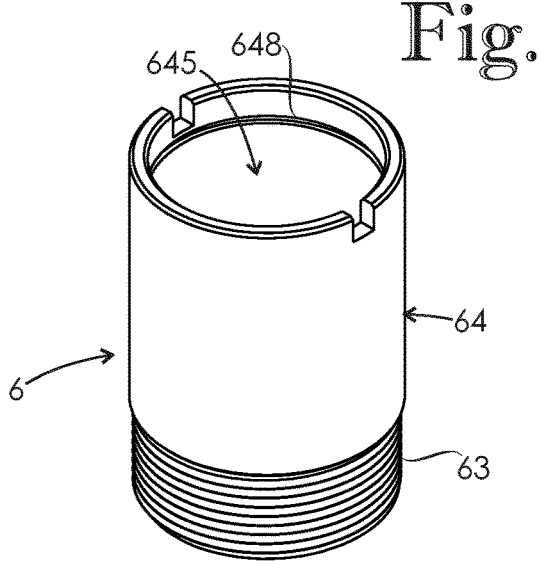
FIG. 5 shows a feedthrough member of the feedthrough assembly of FIG. 1.

FIG. 5 shows the feedthrough member 6 as a separate component detached from the rest of the feedthrough assembly. The feedthrough member 6 comprises a body part 64 provided with an external thread 63, a feedthrough aperture 645 extending through the body part 64 in an axial direction of the body part 64, and a lock ring groove 648. The lock ring groove 648 is formed on the surface of the feedthrough aperture 645, and is adapted to receive an internal lock ring. The feedthrough member 6 is made of metallic material.

In FIGS. 2 and 3, the axial direction of the body part 64 is a vertical direction. In FIGS. 1, 2 and 3, the axial direction of the body part 64 of the feedthrough member 6 coincides with the axial direction of the body part 24 of the sealing member 2.

In FIG. 3, the feedthrough member 6 is attached to the wall 8 having a through hole such that the feedthrough aperture 645 and the through hole together provide a passage through the wall 8. The external thread 63 of the feedthrough member 6 co-operates with an internal thread 853 provided in the through hole in the wall 8 for attaching the feedthrough member 6 to the wall 8. The feedthrough aperture 645 and the through hole in the wall 8 are coaxial with each other.

In an alternative embodiment, the body part of the feedthrough member is provided with a flange having at least one screw hole, wherein the feedthrough member is adapted to be attached to a wall having a through hole with at least one screw extending through the at least one screw hole, and co-operating with a corresponding at least one internal thread provided in the wall.

In FIGS. 1, 2 and 3, the sealing member 2 is received in an operative position in the feedthrough aperture 645 of the feedthrough member 6. In the operative position, the feedthrough member 6 is rotatable relative to the sealing member 2, and a radial gap between an outer surface of the sealing member 2 and a surface of the feedthrough aperture 645 is 50 micrometres. In an alternative embodiment, said radial gap is less than or equal to 250 micrometres. In another alternative embodiment, said radial gap is less than or equal to 100 micrometres.

The outer surface of the sealing member 2 is a cylindrical surface, and a surface of the sealing member aperture 245 is a cylindrical surface. In an alternative embodiment, the outer surface of the sealing member has a form of a truncated cone, and a surface of the sealing member aperture has a form of a truncated cone. In a further alternative embodiment, the outer surface of the sealing member has a rotationally symmetrical form, and a surface of the sealing member aperture has a rotationally symmetrical form matching the form of outer surface of the sealing member.

The retaining system is adapted to retain the sealing member 2 in the operative position by preventing an axial movement between the sealing member 2 and feedthrough member 6. The retaining system comprises a retaining member 17 and a retaining projection 67.

Figure 6:
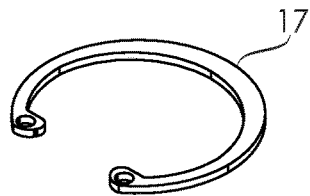
FIG. 6 shows a retaining member of the feedthrough assembly of FIG. 1.
Figure 7:
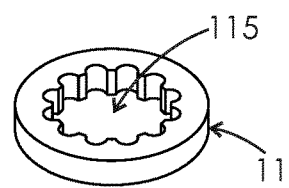
FIG. 7 shows a first spacer of the feedthrough assembly of FIG. 1.
Figure 8:
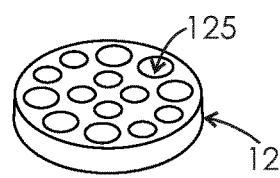
FIG. 8 shows a second spacer of the feedthrough assembly of FIG. 1.

The retaining member 17 is adapted to co-operate with the feedthrough member 6 for preventing the axial movement between the sealing member 2 and feedthrough member 6 in a first axial direction. FIG. 6 shows that the retaining member 17 is an internal lock ring. In FIG. 3, the retaining member 17 is received in the lock ring groove 648.

The retaining projection 67 is provided on the surface of the feedthrough aperture 645 for preventing the axial movement between the sealing member 2 and feedthrough member 6 in a second axial direction opposite to the first axial direction. The retaining projection 67 projects inwards from the surface of the feedthrough aperture 645. FIG. 3 shows that the lock ring groove 648 and the retaining projection 67 are located at a distance from each other in the axial direction of the body part 64 of the feedthrough member 6.

The elongated members 4 are hermetically sealed to the surface of the sealing member aperture 245 by a sealing system comprising filler material 13 shown in FIG. 3. In an embodiment, the filler material 13 comprises resin. In another embodiment, the filler material 13 comprises adhesive. In some embodiments, hermetical sealing between the at least one elongated member and the surface of the sealing member aperture is not required. Herein, hermetic seal between the at least one elongated member and the surface of the sealing member aperture means that passage of gases through the sealing member aperture is prevented.

The elongated members 4 are integrated to the sealing member 2 by the filler material 13. The elongated members 4 cannot be moved relative to the body part 24 of the sealing member.

In addition to the filler material 13, the sealing system comprises a first spacer 11 and second spacer 12 keeping the elongated members 4 at a distance from the surface of the sealing member aperture 245. The first spacer 11 and second spacer 12 are located at a distance from each other in the axial direction of the body part 24 of the sealing member 2 such that the filler material 13 is located between the first spacer 11 and second spacer 12 in the axial direction of the body part 24 of the sealing member 2.

The first spacer 11 comprises a single first spacer aperture 115 through which the plurality of elongated members 4 extend. The second spacer 12 comprises a plurality of second spacer apertures 125 such that each of the plurality of elongated members 4 extends through a respective second spacer aperture 125. During a manufacturing process, the filler material 13 is injected through the first spacer aperture 115 between the plurality of elongated members 4, and the second spacer 12 prevents the filler material 13 from escaping from the opposite end of the sealing member 2.

The first spacer 11 and the second spacer 12 are integrated to the sealing member 2 by the filler material 13. Therefore, the body part 24 of the sealing member, the first spacer 11, the second spacer 12, the filler material 13 and the plurality of elongated members 4 form an aggregate whose parts cannot be moved relative to each other.

The first spacer 11 and second spacer 12 are made of rubber. In an alternative embodiment, the first spacer and second spacer are made of another electrically insulating material.

It will be obvious to a person skilled in the art that the inventive concept can be implemented in various ways. The invention and its embodiments are not limited to the examples described above but may vary within the scope of the claims.

The invention claimed is:

1. A feedthrough assembly comprising:
  a sealing member comprising a body part having a sealing member aperture extending through the body part in an axial direction of the body part;
  at least one elongated member extending through the sealing member aperture, and being sealed to a surface of the sealing member aperture;
  wherein the feedthrough assembly comprises a feedthrough member including a body part having a feedthrough aperture extending through the body part in an axial direction of the body part, the feedthrough member being adapted to be attached to a wall having a through hole such that the feedthrough aperture and the through hole together provide a passage through the wall, and the feedthrough member is adapted to receive the sealing member in the feedthrough aperture to an operative position in which the feedthrough member is rotatable relative to the sealing member, and a gap between an outer surface of the sealing member and a surface of the feedthrough aperture is less than or equal to 250 micrometres;
  wherein the feedthrough assembly comprises a retaining system adapted to retain the sealing member in the operative position by preventing an axial movement between the sealing member and feedthrough member;
  wherein the retaining system comprises a retaining member adapted to co-operate with the feedthrough member for preventing the axial movement between the sealing member and feedthrough member in a first axial direction, and a retaining projection provided on the surface of the feedthrough aperture for preventing the axial movement between the sealing member and feedthrough member in a second axial direction opposite to the first axial direction; and
  wherein the retaining member is a locking ring.

2. The feedthrough assembly according to claim 1, wherein the feedthrough member is provided with an external thread adapted to co-operate with an internal thread provided in the through hole in the wall for attaching the feedthrough member the wall.

3. The feedthrough assembly as claimed in claim 1, wherein the at least one elongated member is sealed to the surface of the sealing member aperture by a sealing system including filler material.

4. The feedthrough assembly as claimed in claim 3, wherein the sealing system comprises a first spacer and second spacer keeping the at least one elongated member at a distance from the surface of the sealing member aperture, the first spacer and second spacer being located at a distance from each other in the axial direction of the body part of the sealing member.

5. The feedthrough assembly as claimed in claim 4, wherein the filler material located between the first spacer and second spacer in the axial direction of the body part of the sealing member.

6. The feedthrough assembly as claimed in claim 5, wherein the at least one elongated member comprises a plurality of elongated members, and the first spacer includes a single first spacer aperture through which the plurality of elongated members extend, and the second spacer includes a plurality of second spacer apertures such that each of the plurality of elongated members extends through a respective second spacer aperture.

7. The feedthrough assembly as claimed in claim 4, wherein the first spacer and second spacer are made of rubber.

8. The feedthrough assembly as claimed in claim 3, wherein the sealing system hermetically seals the at least one elongated member to the surface of the sealing member aperture.

9. The feedthrough assembly as claimed in claim 1, wherein the sealing member is made of metallic material, and the feedthrough member is made of metallic material.

10. The feedthrough assembly as claimed in claim 1, wherein the at least one elongated member is a flexible member.

11. The feedthrough assembly as claimed in claim 10, wherein the at least one elongated member an electric cable.

12. The feedthrough assembly as claimed in claim 1, wherein the gap between the outer surface of the sealing member and the surface of the feedthrough aperture is less than or equal to 100 micrometres.

13. The feedthrough assembly according to claim 2, wherein the feedthrough assembly comprises a retaining system adapted to retain the sealing member in the operative position by preventing an axial movement between the sealing member and feedthrough member.

14. The feedthrough assembly as claimed in claim 2, wherein the at least one elongated member is sealed to the surface of the sealing member aperture by a sealing system including filler material such as resin or adhesive.

* * * * *